(12) United States Patent
Noto

(10) Patent No.: US 6,383,429 B1
(45) Date of Patent: May 7, 2002

(54) METHOD OF MAKING A SCULPTURE

(76) Inventor: Mario Noto, c/o Rocco Noto Sculpture Studio, 10-06 38th Ave., LIC, NY (US) 11101

( * ) Notice: Subject to any disclaimer, the term of this patent is extended or adjusted under 35 U.S.C. 154(b) by 0 days.

(21) Appl. No.: 09/427,608

(22) Filed: Oct. 27, 1999

(51) Int. Cl.$^7$ .............................................. B29C 39/10
(52) U.S. Cl. ..................... 264/135; 264/134; 264/271.1
(58) Field of Search ................................ 264/134, 135, 264/271.1

(56) References Cited

U.S. PATENT DOCUMENTS

| | | | | |
|---|---|---|---|---|
| 2,511,552 A | * | 6/1950 | Stuempges | 428/13 |
| 2,636,301 A | * | 4/1953 | Wilmsen | 428/13 |
| 2,731,672 A | * | 1/1956 | Davis et al. | 264/132 |
| 3,877,786 A | * | 4/1975 | Booras et al. | 264/129 |
| 3,929,692 A | * | 12/1975 | Offerman | 524/44 |
| 3,994,763 A | * | 11/1976 | Sheath et al. | 156/182 |
| 4,169,088 A | * | 9/1979 | Hansen | 524/503 |
| 4,307,137 A | * | 12/1981 | Ota et al. | 428/35 |
| 4,310,370 A | * | 1/1982 | Arai et al. | 156/220 |
| 4,347,270 A | * | 8/1982 | Hart | 428/13 |
| 4,414,317 A | * | 11/1983 | Culp et al. | |
| 5,209,956 A | * | 5/1993 | Poll | 428/13 |
| 5,275,675 A | * | 1/1994 | Keith | 156/155 |
| 5,367,801 A | * | 11/1994 | Ahn | 40/152 |
| 5,397,522 A | * | 3/1995 | Shinozuka et al. | 264/134 |
| 5,419,940 A | * | 5/1995 | Wood et al. | 428/13 |
| 5,427,724 A | * | 6/1995 | Zimmerman | 264/134 |
| 5,436,038 A | * | 7/1995 | Gelb | 428/13 |

* cited by examiner

Primary Examiner—Allan R. Kuhns
(74) Attorney, Agent, or Firm—Notaro & Michalos PC

(57) ABSTRACT

A method and a piece of sculpture made with the method, begins by forming a first three-dimensional transparent member having a selected surface which is intended to become a visible embedded surface in the sculpture. Acrylic resin is preferred for the first member but other clear cast material can also be used. A film of water or alcohol soluble material, preferably PVA with or without additive and solvent, is sprayed onto the selected surface, preferably using an air brush. The film is allowed to dry and the first member with the film is placed in a mold having a cavity with a shape of the final sculpture product, the cavity having room for at least part of the first member, and a void corresponding to the shape of a second member. The selected surface is at least partly exposed to this void in the mold. The mold is then filled a transparent castable liquid material, which may also be acrylic resin, and the contents of the mold are cured to form the sculpture.

10 Claims, 8 Drawing Sheets

METHOD OF MAKING A SCULPTURE

FIELD AND BACKGROUND OF THE INVENTION

The present invention relates in general to sculpture and methods of making sculpture, and in particular to a new and useful method and resulting sculpture product which is substantially transparent but which includes a visible, three-dimensional surface embedded within the sculpture.

U.S. Pat. No. 4,347,270 to Hart discloses a decorative article and method where a shaped mass of transparent material is embodied within a block of the same material so as to provide a shaped interface. Selected regions or areas of the interface are conditioned with light reflective material such as paint or other light reflecting or absorbing liquid, so that portions of the otherwise invisible interface become visible.

Other examples of embedded objects within a transparent block or body also exist in the prior art. The object may be a simple design of essentially two-dimensional characteristics or it may be a three-dimensional design. Natural objects are examples of the latter type and, in many instances, natural objects may be simulated by forming a mold cavity in a transparent body and filling it so as to simulate a natural object. U.S. Pat. No. 2,731,672 to Davis et al., U.S. Pat. No. 2,636,301 to Wilmsen and U.S. Pat. No. 2,511,552 Stuempges illustrate these techniques.

U.S. Pat. No. 5,436,038 to Gelb discloses a transparent article having a cut in the side which creates a different optical appearance when viewed through the sides of the article. The background section of this patent discusses similar prior art objects, including articles formed from acrylic blocks that are joined at an interface which has been colored to create an optical effect.

U.S. Pat. No. 4,307,137 to Ota, et al. teaches a method of creating optical designs in a synthetic resin article using polyethylene terephthalate (PET). The method of the Ota, et al. patent takes advantage of the different physical properties of PET exhibited as a result of cooling at different rates to produce different optical effects. A whitened surface can be produced in this manner.

A decorative panel having a support and effect portion contained between a pair of glass sheets is disclosed by U.S. Pat. No. 5,209,956 to Poll. The support and effect portion are composed of a plastic support layer partially covered by a coating forming an effect layer. Space between the upper glass sheet and the top of the support layer and effect layer is filled with a clear plastic.

U.S. Pat. No. 5,419,940 to Wood, et al. shows an acrylic award assembly which uses methylene chloride to fuse an upper acrylic object to a colorized acrylic base. The base acrylic is colored using a suitable dye or pigment. The upper acrylic object and base are free standing and are not encased in an additional layer of acrylic.

U.S. Pat. No. 5,275,675 to Keith discloses a method of making intaglio designs in acrylic by pressing heated design forms into the acrylic and then withdrawing them at a predetermined temperature.

A display article formed by at least three panels of partially transparent materials each bearing a portion of a complete design is disclosed in U.S. Pat. No. 5,367,801 to Ahn. The three panels are joined together to make the complete design.

Other patents disclosing various decorative structures and methods are U.S. Pat. No. 4,414,317 to Culp, et al.; U.S. Pat. No. 5,397,522 to Shinozuka, et al.; U.S. Pat. No. 5,427,724; and U.S. Pat. No. 5,512,226 to Rosica, et al.

The present invention uses a technique which is neither disclosed by, nor obvious from the prior art, and which results in the creation of highly esthetic sculpture.

SUMMARY OF THE INVENTION

According to the present invention an acrylic or other transparent molded material sculpture comprises a first member of clear material encased within or at one side of a second member preferable made of the same clear material but having a different shape.

The otherwise invisible interface or embedded surface between the first, preferably acrylic member, and the second member is made visible by applying a film of interface modifying material to only those parts of the interface or surface of the first member which is meant to be visible, during the making of the sculpture.

The interface modifying material, which is preferably PVA (polyvinyl alcohol) for best results, may be spraying or wrapping onto a selected surface of the first member that is to be visible in the final sculpture. The first member is then placed in a mold having a cavity with the shape of the final sculpture product. The cavity has room for the first member and a void corresponding to the shape of the second member. Clear liquid acrylic or other transparent castable liquid material is then poured into the void to fill it.

The combined contents of the mold are then subjected to known heat and pressure for creating the molded product which has the outer shape of the sculpture and in which the selected embedded surface is clearly visible.

A pigment, water soluble dye, metal or mineral powder or other additive may be included in the film which covers the visible interface in order to add some coloration, is desired.

Accordingly, an object of the present invention is to provide a method and a piece of sculpture made with the method, the method comprising: forming a first three-dimensional transparent member having a selected surface which is intended to become a visible embedded surface in the sculpture; applying a film of water or alcohol soluble material to the selected surface; placing the first member with the film in a mold having a cavity with a shape of the final sculpture product, the cavity having room for the first member and a void corresponding to the shape of a second member, the selected surface being at least partly exposed to the void; filing the void with a transparent castable liquid material; and curing the contents of the mold to form the sculpture.

For the purpose of this disclosure the word "sculpture" is used to mean any three-dimensional object which is decorative or useful or both, and which is for display alone or as part of another structure such as a building, furniture, displays or the like.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENTS

Figure 3:
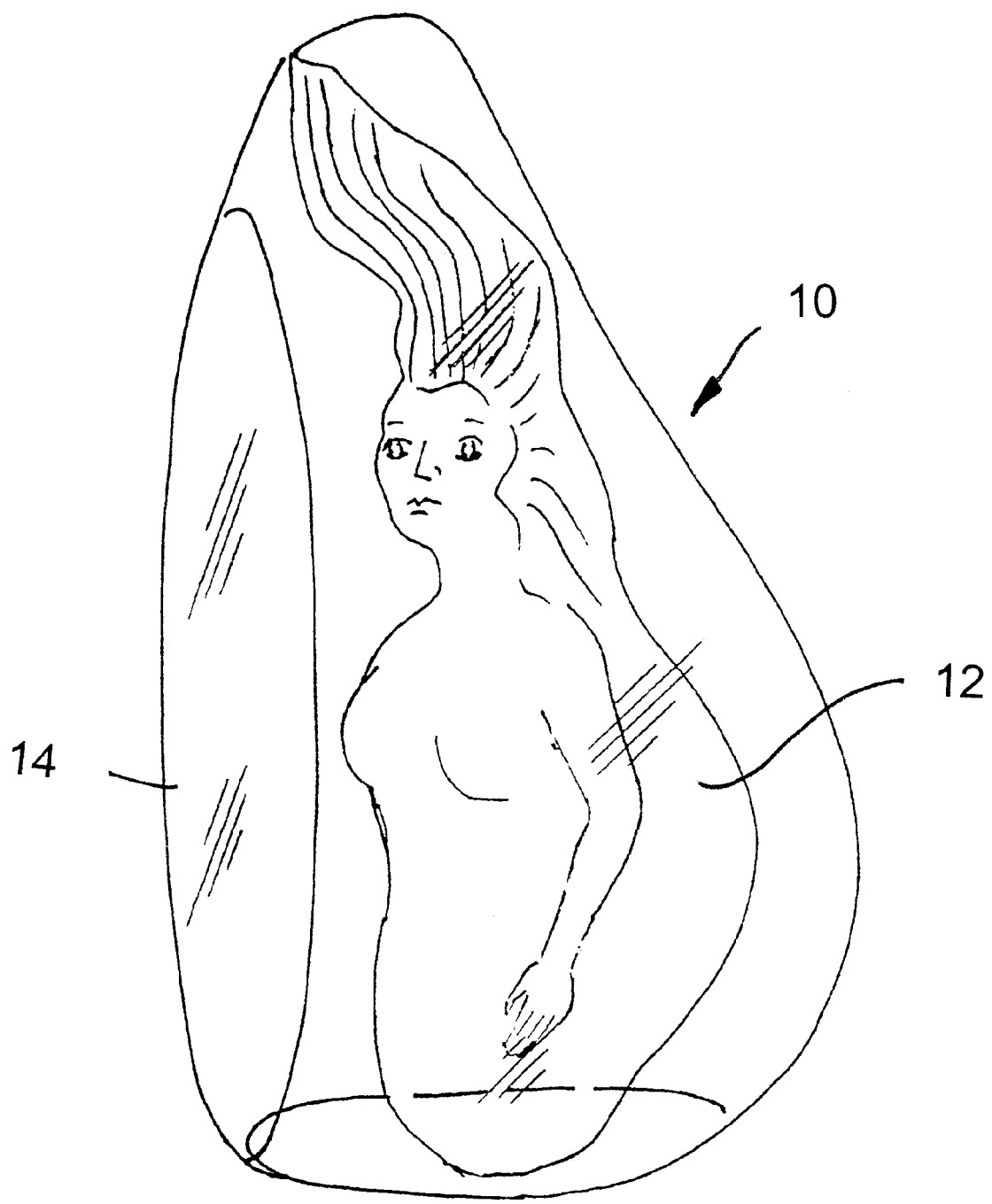
FIG. 3 is a perspective view of the sculpture made in accordance with present invention.

Referring to the drawings and particular, the invention embodied in FIG. 3 comprises a three-dimensional piece of sculpture generally designated 10, containing an embedded visible surface 12 that can be seen through the clear medium of the sculpture, for example, cured acrylic resin.

Figure 6:
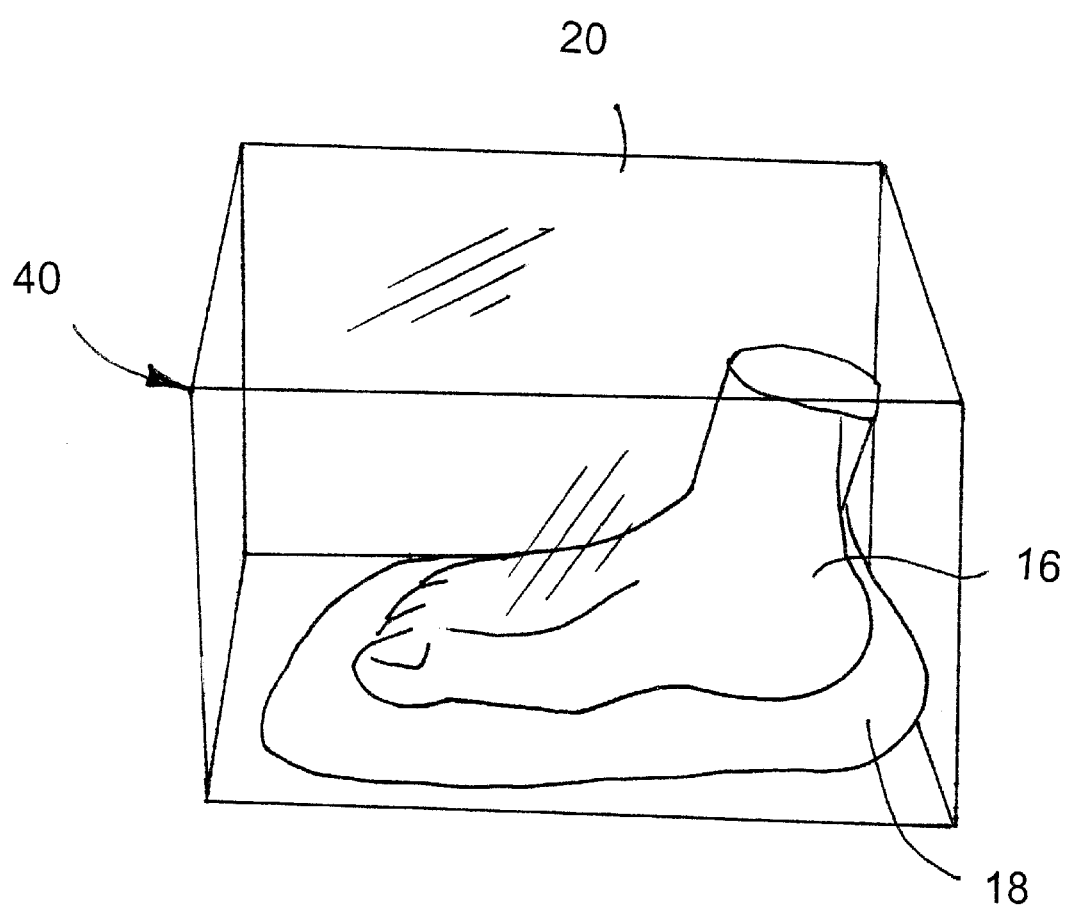
FIG. 6 is a perspective view of a sculpture of the present invention where the first member is substantially embedded in the second member.

Another example of a piece of sculpture of the present invention in shown in FIG. 6. As is evident from FIG. 3 and FIG. 6, the outer shape of the finished piece of sculpture can be any desired shape as can the visible embedded surface in the sculpture. In FIG. 3, the visible surface is the torso of a woman. From the back of the sculpture (to the right in FIG. 3), a negative, concave image of the torso is visible and from the front (to the left in FIG. 3), a positive, convex image can be seen, for example, through a flattened exterior surface 14. Flat surface 14 is a non-essential feature of the sculpture shape since any desired three-dimensional shape can be used for the first and second members and for the selected surface.

In FIG. 6, the image of a foot 16 on a base 18 is created by the embedded surface. The foot and base which together form a first member, are surrounded by a solid rectangle 20 forming a second member and the remainder of the piece of sculpture.

Figure 1:
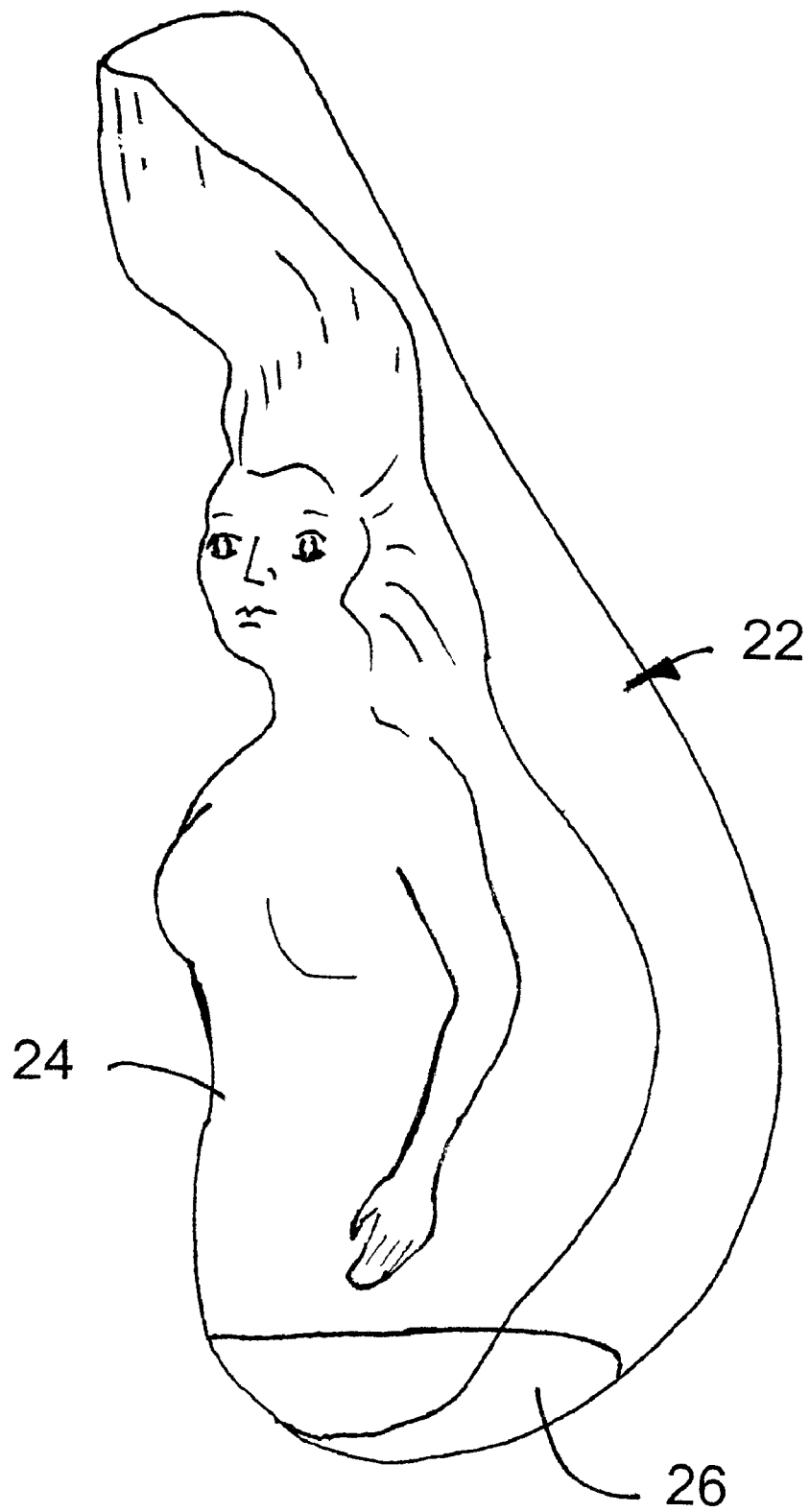
FIG. 1 is a perspective view of first three-dimensional transparent member having an interface or selected surface which is to be visible in a final sculpture.

Referring to FIG. 1, the method of the invention begins with the creation of a first three-dimensional transparent member 22 made of transparent medium such as acrylic resin using conventional casting techniques. A surface of member 22 is selected to become the embedded visible surface or interface which will eventually be within the volume of the finished sculpture. The first member 22 as a surface 24 depicting the torso and swept back hair of a woman. First member 22 also includes a flat base 26 which allows the first member to stand. A base is not necessary, however and the first member can be made in any three-dimensional shape.

In accordance with one embodiment of the present invention, first member 22 may be left in a pre-cured or "gummy" state, after the acrylic has been molded and set but before the final pressure and heating step which is conventionally used for curing acrylic resin castings.

Alternatively, first member 22 may be fully cured with or without its outer surfaces sanded and polished to crystal clarity as is usual for finished acrylic cast pieces. As a further alternative, the rear surfaces of member 22, away from the selected surface 24, maybe subjected to sanding and polishing while surface 24 is left in its milky white condition as it comes from the mold.

Figure 2:
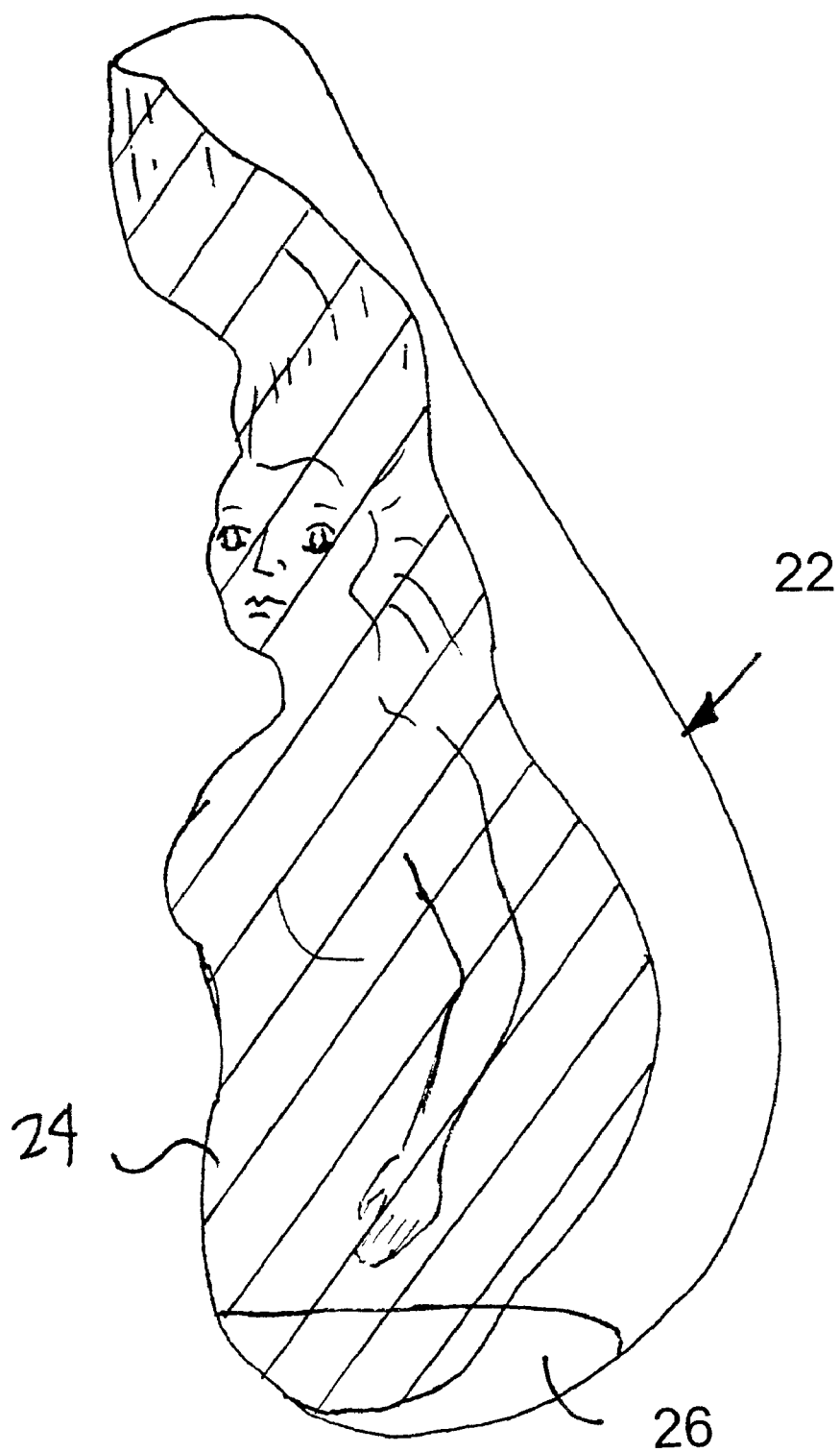
FIG. 2 is a view similar to FIG. 1 with the selected surface coated with a film according to the present invention.

FIG. 2 shows surface 24 cross hatched to indicate the application, preferably by spraying, of a thin film of PVA mold release agent. Advantageously the film is applied to a thickness of from about 0.01 mil to about 4.00 mil, but preferably from about 0.5 to about 2.0 mil. The liquid PVA may also be diluted with methyl alcohol to make it easier to spray and additives such as pigment, water soluble dye, powdered minerals or metals, or other additives, added to the PVA to modify the appearance of the surface 24 to be embedded in the final product.

Examples of the additives are, pearl white luster powder, aluminum, bronze or other metal or mineral powder, or water soluble dye. From about 0.05% by weight to about 3% by weight additive can be used. Higher amounts tend to clog the spray head for spraying the film liquid.

Special effects can be achieved such as making different parts of the surface more for less visible, by using thicker or thinner layers of film on the selected surface. This is best done using an airbrush containing the film making liquid.

Before spraying the film liquid, the outer surfaces of the first member 22 are washed and dried. After applying the film the film is allowed to dry and harden. Drying at about 75° F. to 80° F. for about ½ hour works well. During drying any alcohol solvent evaporates leaving a polymer film. Any parts of surface 24 not covered by the film will not be visible in the final product. In this way only so much of the selected surface which is wished to be visible in the finished piece, and be accurately determined.

First member 22 is then placed in a mold which is similar to the mold which was used to form the first piece initially, but which includes a larger cavity that can accommodate all or part of first member 22, plus a void volume which at least partly communicates with surface 24. This volume or void is filled with additional liquid acrylic resin of the same type that was used to make first member 22. The newly added acrylic resin will eventually form a second member of the sculpture which at least partly covers the surface 24 thus eventually making a visible embedded surface.

The mold is then subjected to conventional heat and pressure treatment, for example, about 160° F. to 170° F for about 10 to 12 hours. The sculpture is then removed from the mold and cooled in a cooling tank for an additional 10 to 12 hours until it reaches room temperature.

After cooling the outer surfaces of the sculpture are sanded with ever finer grit (for example starting with 80 grit paper and finishing with 350 grit paper) followed by polishing until a crystal clear surface is achieved.

One major advantage of the present invention is that PVA is commonly used in the casting of clear mediums such as acrylic resin, as a mold release agent and is thus readily available. The inventor has found that other film forming liquids can also be used as long as they are either water or alcohol soluble.

Another unusual and unexpected achievement of the invention is that the thin film made of material which is water or alcohol soluble, renders the embedded surface visible. Without this film, the inventor has found that the embedded surface completely disappears when the first member and second member are both made of acrylic material. The partially or completely cured first member in the mold receives the acrylic resin which closely adheres to the interface (the selected surface which is in the mold void) thus rendering the interface completely invisible. The inventor has found that by applying this thin layer, which is generally clear even when it has a small amount of additive, the interface becomes clearly visible in the final product. The inventor believes that this is a function of the heat and pressure during the initial curing of the acrylic in the mold.

Figure 4:
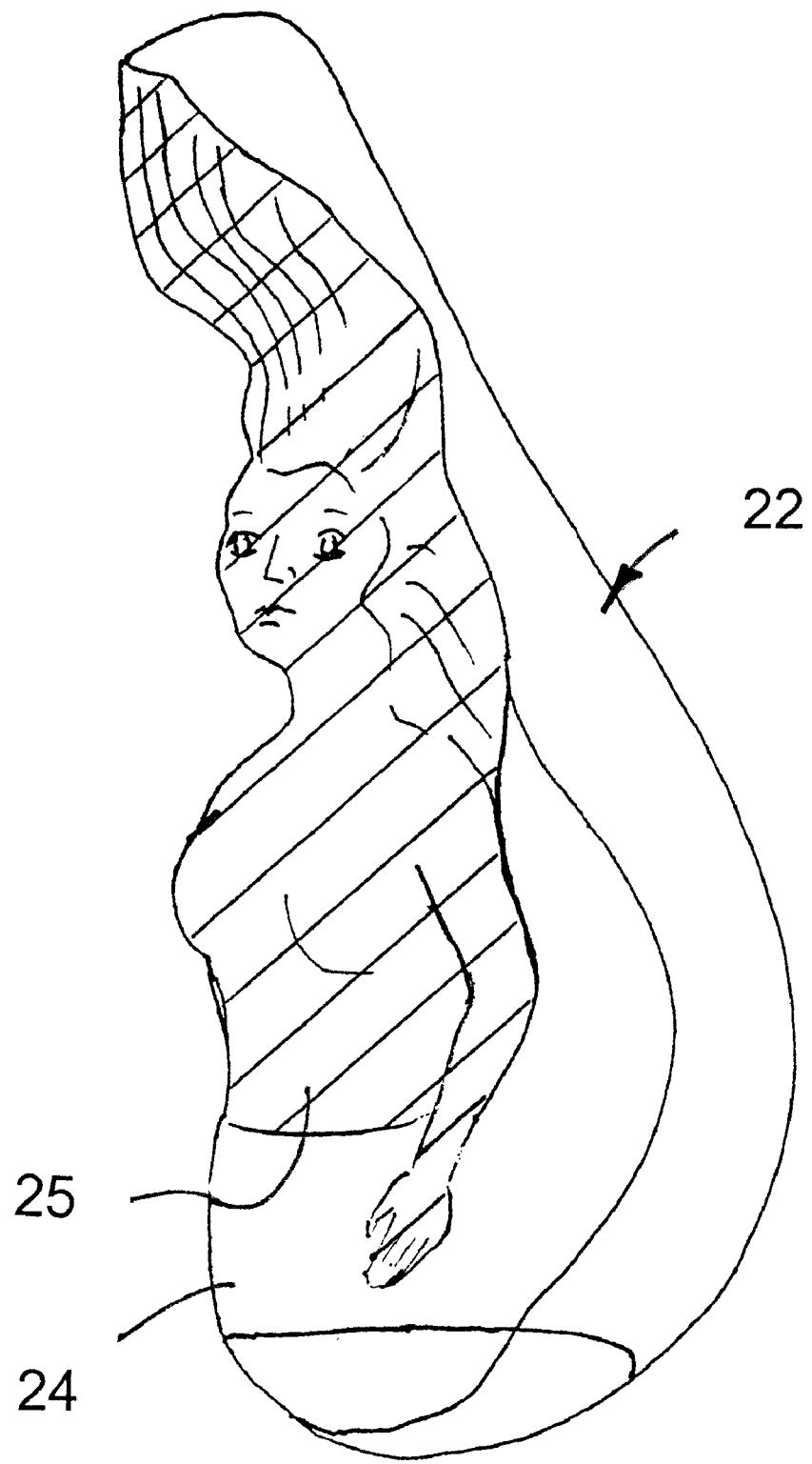
FIG. 4 is a view similar to FIG. 2 with a smaller area of the selected surface covered by the film.
Figure 5:
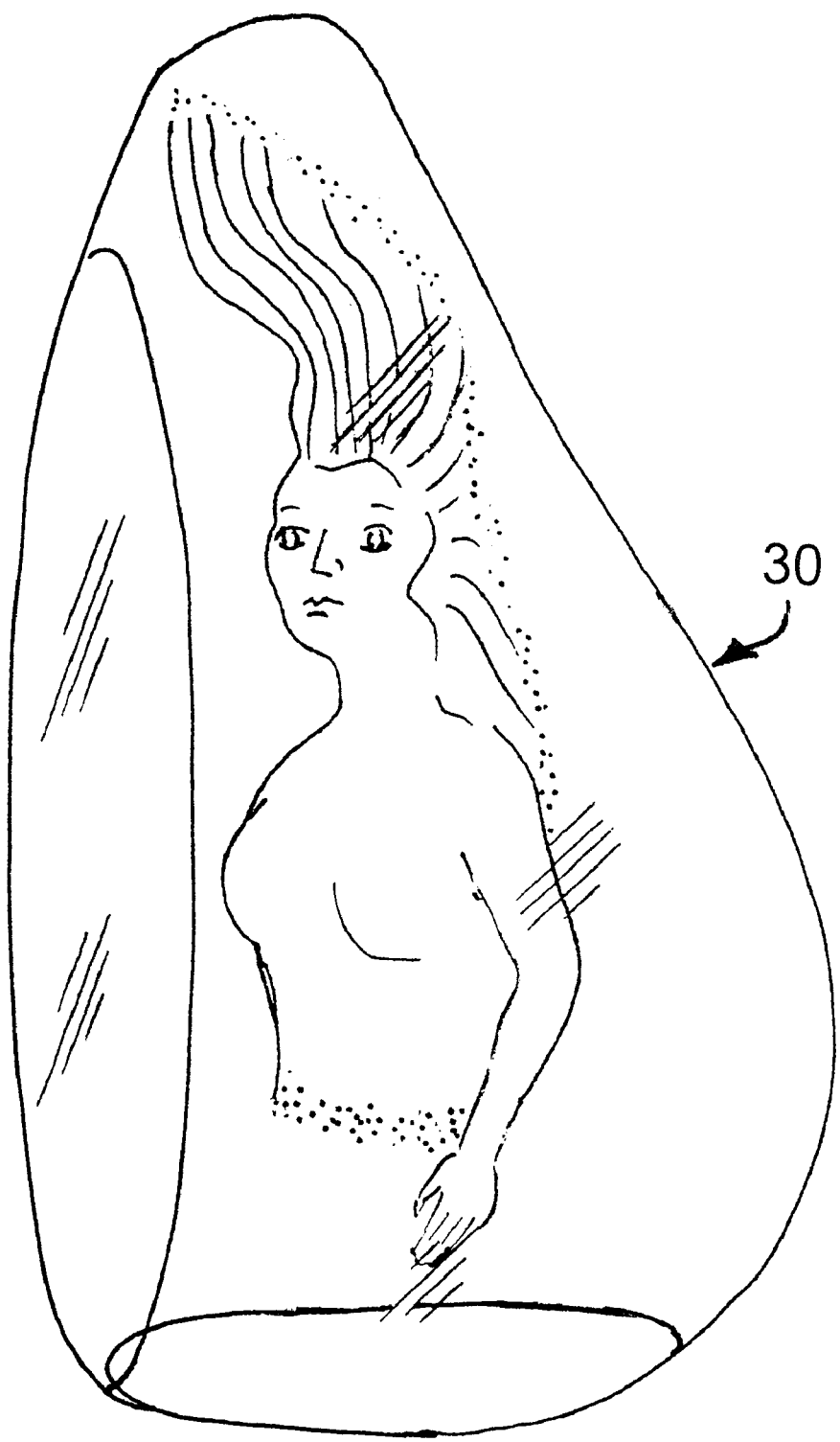
FIG. 5 is a view similar to FIG. 3 but with the selected surface covered by film as shown in FIG. 4.

The inventor has experimented with different thicknesses of film and has even been able to make the visible surface gradually disappear near the edges of the selected surface by tapering the thickness of the film. This is particularly why the use of an airbrush is advantageous according to the method of the invention and that film can be applied just an artist applies paint. FIG. 4 illustrates a case where the cross hatched area is only a part 25 of the selected surface 24, which is intended to be visible in the final piece of sculpture. With the film applied only to surface 25, the piece of sculpture shown in FIG. 5 results, where a suspended three dimensional image is created within the volume of the piece of sculpture generally designated 30. Although the visible embedded surface appears to be three dimensional, it is in fact only the interface surface between the first and second transparent three dimensional members that make up the piece of sculpture 30. This is confirmed by an observer by the eerie image of a negative concave shape when viewing the rear of the piece of sculpture.

FIG. 6 illustrates a first member in the form of foot 16 on a support 18 which are together cast in acrylic or other clear castable material and substantially embedded, except for the bottom of base 18, in the second member 20 having the form of a solid rectangular block to create the final piece of sculpture generally designated 40.

Figure 7:
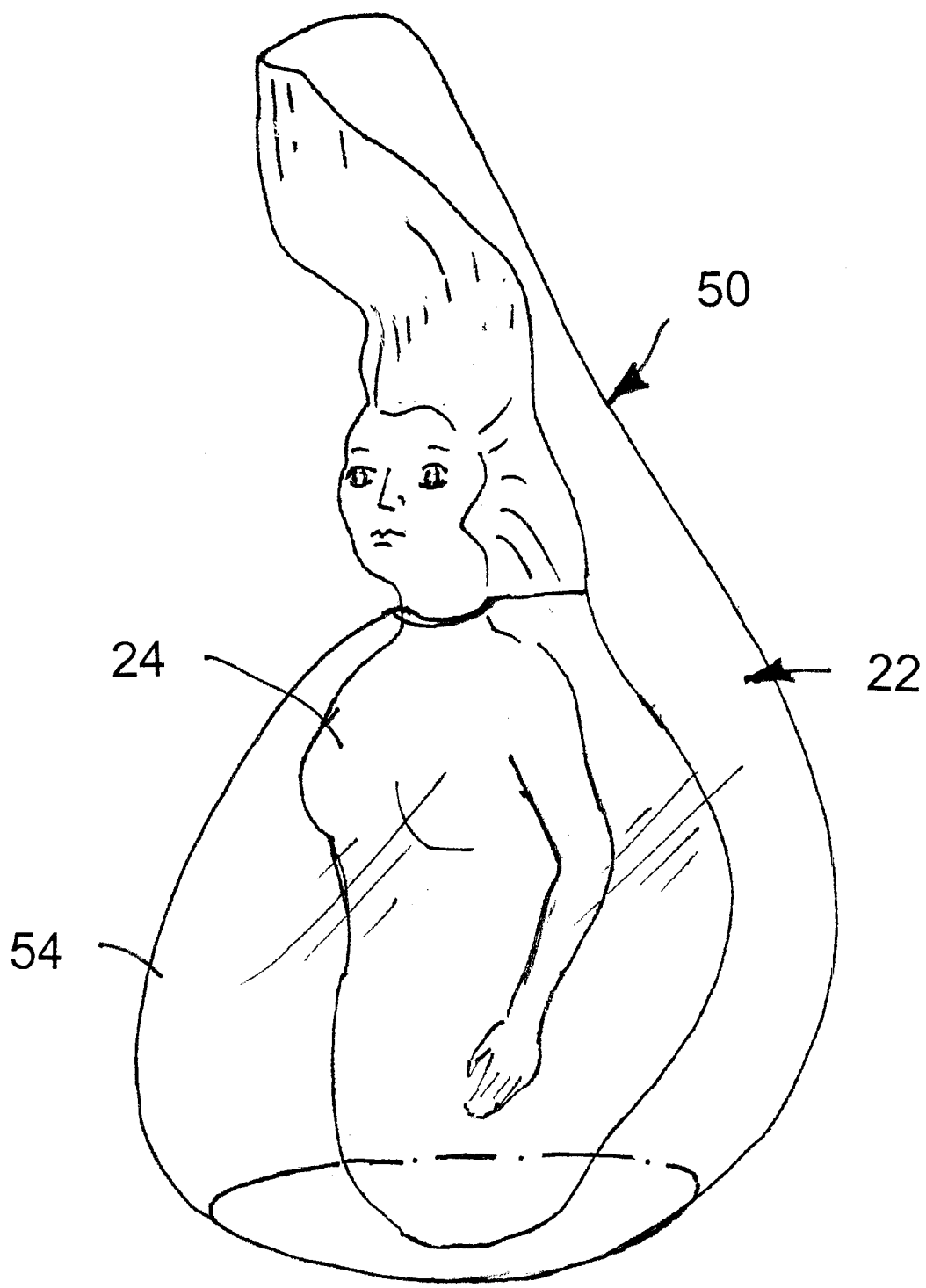
FIG. 7 is a perspective view of another sculpture of the present invention where the first member is only partly covered by the second member to embed a selected visible surface of the first member.

FIG. 7 illustrates another embodiment of the invention where the piece of sculpture 50 includes a first three dimensional transparent member 22 which is identical to member 22 shown in FIG. 1, and a second three dimensional transparent member 54 which covers only part of the selected surface 24 of the first member 22. In the embodiment of FIG. 7, the mold which forms the final piece of sculpture 50 accommodates only the lower portion of first member 22 and the entire volume of the second member 54 as well as the entire visible embedded surface.

Concerning the thickness of the film of material which is water or alcohol soluble, if less than 0.01 mil of film is applied, the selected surface fades to invisibility and can not be seen in the finished product. If more than about 4.00 mil is applied, the selected surface begins to crack and become unsightly and delamination occurs between the first and second members. The inventor believes the phenomenon occuring to make the interface visible is the shrinking of the second member toward the first member during the heat and pressure casting of the finished product. This is confirmed by the fact that cracking is less likely to occur when the second member has a larger volume causing it to shrink more toward the film and thus accommodate thicker film layers.

Additional details concerning manufacture of the piece of sculpture with the embedded visible surface follows:

The room of operation must be well cleaned, free of dirt, dust and other damaging or contaminating items.

Workers must wear white suits and hair covers. One way of removing dirt is by spraying water using an airbrush into the air and sweeping the collected dust on the floor and other places it could settle.

Preparing the Mold

The first or inner mold for creating the first member must first be cleaned with soap and a lot of water using a brush or other type or scrubbing instrument. Soap must then be removed form the mold. Dry the mold using an airgun and rags. The mold must be totally dry. The rubber portion of the mold is placed into the shell for stability. Airbrush the PVA mold release agent sold for example by Specialty Products Co., use from 1 to 3 coats on the mold. Place all parts of the mold together carefully and tightly using nuts and bolts. Avoiding any contact with dirt, cover any poring holes when not using the mold. Place into a drying closet from 1 to 3 hours to assure the drying of the PVA.

Preparation for the Casting

The mixer must first be cleaned from previous castings. This is best done by pouring monomer through a cloth filter int to he mixer and running the mixer for 20 minutes. Extract monomer and pour the same monomer into the mixer as previously done. Keep repeating process until the mixer is perfectly clean. When finished, cover all pouring holes to prevent the collection of any dirt or dust.

Clean polymer filter eliminating any evidence of any previous castings. The filter itself must be cleaned with air, water and soap and air dried with air. The filter must be perfectly dry. Clean filter machine itself and put all back together. Take polymer from drum and filter. Leave polymer in filter pan until needed to assure it is dirt free.

Casting Operation

Using 38% monomer and 62% polymer (general mix design) and 1 cup of blue tint forever, to form 2 gallons of mixture.

Put monomer and blue tint into mixer through a cloth filter. Add polymer slowly while mixer is running. To ensure proper mixing mix for 10 to 20 minutes depending on the temperature of the room. After mix is complete, remove mold from drying closet and pour. Cover the pouring holes. Take poured mold and place into pressure tank. Fill tank with air to a psi reading from 70 to 100. Leave for 8 to 12 hours. Th mixing machine must be cleaned after casting is complete using the previously mentioned method. Leave monomer in mixer overnight to insure cleaning of the mixer.

After 8 to 12 hours, remove air from tank and then remove poured mold from within. Carefully take apart mold and remove first poured acrylic from mold. Remove PVA from casting.

Preparation for Embedment

Use cleaning process as stated in the beginning, clean the room, the machinery and the second mold. Second mold is the one used for the exterior shape or second member. Mix desired colored powder with PVA and airbrush on to first casting, use 1 to 4 coats depending on desired effect. Let dry between coats. When properly dried, place the first casting into the second mold and close the mold.

Release pressure and remove the mold from the pressure tank. Casting should have a rubber like consistency like before. Remove the casting from the second mold and place it into a third mold. The third mold is used solely as a bed when curing the acrylic. If the third mold is not available, cover casting with plaster and burlap to avoid any movement during the curing process. Place mold into pressure tank and add 80 to 120 lbs. of pressure and heat.

Heat

Figure 8:
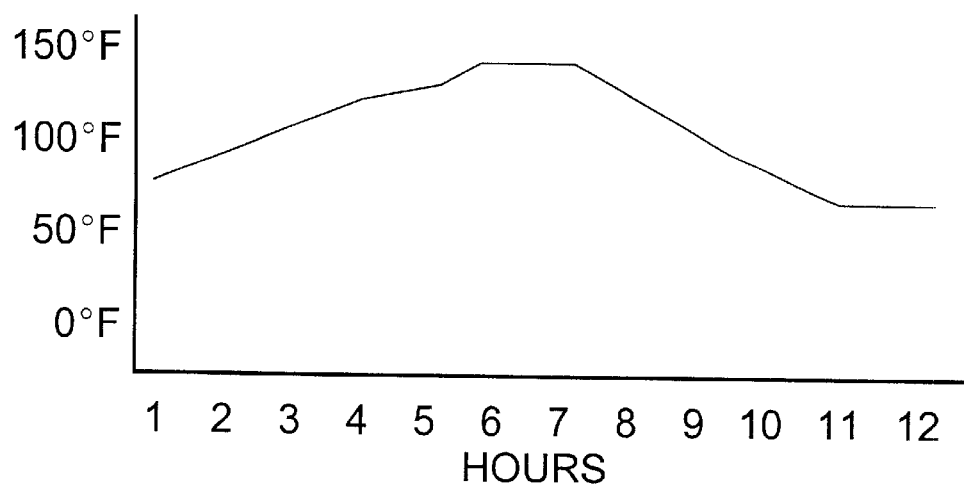
FIG. 8 is a graph plotting temperature against time showing one example of curing of the piece of sculpture in accordance with the present invention.
Figure 9:
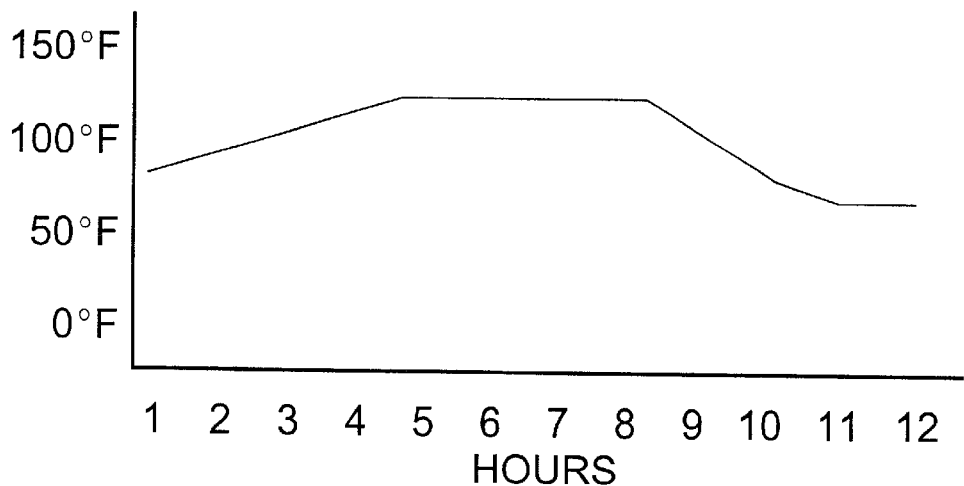
FIG. 9 is a graph similar to FIG. 8 showing another curing process.

The heating process is very important in the casting of acrylic. The rate of added heat and the top off points are critical depending on the size, shape and thickness of the casting. Two examples of typical heat charts are as follows (Table 1 is illustrated in FIG. 8 and Table 2, in FIG. 9):

TABLE 1

| DEGREES | TIME IN MINUTES |
|---|---|
| 85 | 160 |
| 95 | 120 |
| 105 | 120 |
| 115 | 120 |
| 120 | 60 |
| 135 | 120 |
| 135 | 240 |
| 120 | 120 |
| 100 | 120 |
| 80 | 60 |
| 70 | 60 |
| 70 | 70 |

TABLE 2

| DEGREES | TIME IN MINUTES |
|---|---|
| 85 | 160 |
| 95 | 120 |
| 105 | 120 |
| 115 | 120 |
| 120 | 60 |
| 120 | 120 |
| 120 | 120 |
| 120 | 120 |
| 100 | 120 |
| 80 | 60 |
| 70 | 60 |
| 70 | 70 |

These are just two examples of the heating required to properly cast acrylics according to the invention. The type used as was stated, depends on the sculpture itself. A general rule is the larger the piece, the less heat you will need to cure it. The piece will create its own internal heat. Too much heat may cause delamination or cracking. To little heat will cause the piece not to cure.

Figure 10:
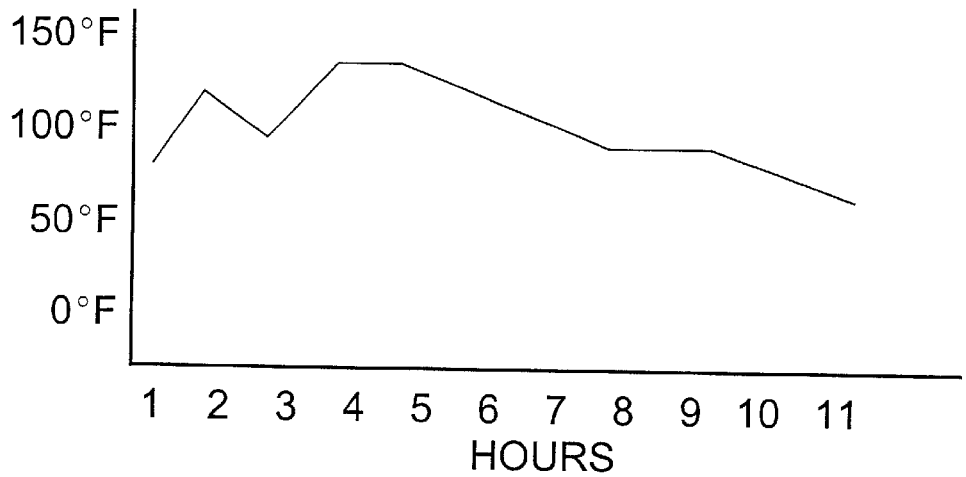
FIG. 10 is a view similar to FIG. 8 showing a still further curing process.

Adjusting with heat caused different effects. For example, a total silver delaminated effect is caused by the heat steps of Table 3 and FIG. 10.

TABLE 3

| DEGREES | TIME IN MINUTES |
|---|---|
| 80 | 120 |
| 120 | 120 |
| 100 | 120 |
| 130 | 180 |
| 130 | 240 |
| 120 | 60 |
| 110 | 60 |
| 100 | 120 |
| 100 | 60 |
| 90 | 60 |
| 80 | 60 |

Special Items Needed

Monomer: Methyl Methacrylate Monomer m205;
Polymer: Lucite L6751-275#;
PVA: Poly Vinal Alcohol;
Color: Any water/alcohol bases or any powder (metals, graphite, talcum, etc.);

Rubber or other type of mold as the first mold;
The second outer mold;
A pressure tank;
A pressure and heat tank;
A mixer; and
An airbrush.

The curing period may be 5 to 20 hours and involves gradual heating thru gradual cooling.

While a specific embodiment of the invention has been shown and described in detail to illustrate the application of the principles of the invention, it will be understood that the invention may be embodied otherwise without departing from such principles.

What is claimed is:

1. A method of making a piece of sculpture comprising:

forming a first three-dimensional transparent member made of acrylic and having a selected surface which is intended to become a visible embedded surface in the piece of sculpture;

applying a film made of PVA before it dries to the selected surface;

allowing the film to dry;

placing the first member with the dry film in a mold having a cavity with a shape of at least part of the piece of sculpture, the cavity having room for at least part of the first member and a void corresponding to the shape of a second three-dimensional transparent member, the visible embedded surface being in the void;

filing the void with a transparent castable acrylic for making the second three-dimensional transparent member; and curing the contents of the mold to form the piece of sculpture.

2. A method according to claim 1, including applying the film using an airbrush.

3. A method according to claim 1, wherein the film is applied to have a thickness of about 0.01 to about 4.0 mil.

4. A method according to claim 1, including adding an additive to the film before it is applied, the additive being selected from the group consisting of dye, pigment and powder and present in amount of about 0.05% to about 3.0% by weight.

5. A method according to claim 1, including placing the first member in the mold before the first member has fully cured.

6. A method according to claim 1, including placing the first member in the mold after the first member has fully cured.

7. A method according to claim 1 including allowing the film to dry at a temperature of about 75° to 80° F.

8. A method according to claim 1, including curing the contents of the mold at a temperature of about 160° to 170° F. and about 5 to 20 hours.

9. A method according to claim 1, including curing the contents of the mold to form the piece of sculpture using different temperatures during different time periods to adjust the appearance of the visible embedded surface.

10. A method according to claim 9, including first gradually heating and then gradually cooling the contents of the mold during the process over a period of 5 to 20 hours.

* * * * *